United States Patent
Johnson et al.

(10) Patent No.: US 10,965,523 B1
(45) Date of Patent: Mar. 30, 2021

(54) VIRTUAL NETWORK ELEMENT PROVISIONING

(71) Applicant: Sprint Communications Company L.P., Overland Park, KS (US)

(72) Inventors: Anthony E. Johnson, Lee's Summit, MO (US); Joseph M. Murray, Trimble, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 32 days.

(21) Appl. No.: 16/404,001

(22) Filed: May 6, 2019

(51) Int. Cl.
*G06F 13/00* (2006.01)
*H04L 12/24* (2006.01)
*H04W 16/02* (2009.01)

(52) U.S. Cl.
CPC ......... *H04L 41/0803* (2013.01); *H04W 16/02* (2013.01)

(58) Field of Classification Search
CPC ..... H04L 41/0803; H04L 41/08; H04W 16/02
USPC .............. 709/224, 223, 238–244, 202
See application file for complete search history.

(56) References Cited

U.S. PATENT DOCUMENTS

| | | | |
|---|---|---|---|
| 7,289,456 B2 | 10/2007 | Gupta et al. | |
| 8,171,485 B2* | 5/2012 | Muller | G06F 9/485 718/104 |
| 8,442,048 B2 | 5/2013 | Kybay et al. | |
| 8,826,289 B2* | 9/2014 | Muller | G06F 9/5005 718/104 |
| 9,064,216 B2 | 6/2015 | Reddy et al. | |
| 9,203,775 B2 | 12/2015 | Mulligan et al. | |
| 9,524,251 B2* | 12/2016 | Watanabe | G06F 3/0607 |
| 9,652,277 B2 | 5/2017 | Broustis et al. | |
| 9,742,790 B2 | 8/2017 | Sood et al. | |
| 9,954,758 B2 | 4/2018 | N. et al. | |
| 10,153,943 B2* | 12/2018 | Mulligan | H04L 45/02 |
| 2008/0244579 A1* | 10/2008 | Muller | G06F 9/5016 718/100 |
| 2011/0103259 A1 | 5/2011 | Aybay et al. | |
| 2012/0240114 A1* | 9/2012 | Muller | G06F 9/5077 718/1 |
| 2014/0068217 A1* | 3/2014 | Watanabe | G06F 12/14 711/163 |
| 2015/0358248 A1 | 12/2015 | Saha et al. | |
| 2016/0087835 A1* | 3/2016 | Mulligan | H04L 41/0803 709/220 |
| 2017/0236105 A1 | 8/2017 | Feldpusch | |

* cited by examiner

Primary Examiner — Kenneth R Coulter (57) ABSTRACT

A provisioning system receives network element information from a wireless communication network that characterizes a virtual network element. The provisioning system determines that the virtual network element is active and that a provisioning data link is not operational between the virtual network element and the provisioning system. The provisioning system determines a network address for the virtual network element. The provisioning system exchanges network signaling with the virtual network element using the network address to establish the provisioning data link. The provisioning system transfers provisioning data to the virtual network element over the provisioning data link.

20 Claims, 6 Drawing Sheets

VIRTUAL NETWORK ELEMENT PROVISIONING

TECHNICAL BACKGROUND

Wireless user devices exchange wireless signals with wireless communication networks for data services like voice-calling, internet-access, and machine communications. The wireless communication networks have wireless access points that exchange the wireless signals with the wireless user devices. The wireless access points exchange corresponding user data and network signaling with network elements like packet routers and network controllers. The network elements process the user data and network signaling to deliver the data services to the wireless user devices. Popular wireless communication networks comprise Long Term Evolution (LTE) and Fifth Generation New Radio (5GNR).

In the past, each network element was typically a computer with wireless networking software. For example, an older packet router might comprise a single computer having data transceivers, memory, and microprocessors that host an operating system and a routing applications. New network elements have been virtualized. A virtual network element typically comprises a networking application, guest operating system, and virtual machine. A computer that executes virtual network elements still comprises data transceivers, memory, and microprocessors. To serve the virtual network element, the data transceivers, memory, and microprocessors host another operating system and virtual switches.

The virtual switches hosted by the computer communicate with the virtual machines in the virtual network elements. Thus, a multitude of virtual network elements may share the data transceivers, memory, and microprocessors, and operating system over the virtual machines and virtual switches. Network virtualization adds both reliability and efficiency since the networking software is not physically tied to a dedicated set of data transceivers, memory, and microprocessors.

To improve efficiency, the wireless communication networks have network controllers that continuously start and stop the virtual network elements as user demand changes. To improve reliability, the virtual switches and machines allow data transceivers, memory, and microprocessors to be replaced without disrupting the operation of the virtual network elements. A popular form of network virtualization is Network Function Virtualization (NFV). NFV features NFV Infrastructures (NFVIs) that host Virtual Network Functions (VNFs). The VNFs exchange user data and network signaling with the wireless access points to deliver the data services. NFV also has NFV Management and Orchestration (MANO) control to start and stop the VNFs.

The wireless communication networks also have provisioning systems to configure their virtual network elements. For example, a provisioning system may update the routing data in a packet router or load a new control software in a network controller. The provisioning systems establish provisioning links to the virtual network elements when it is time to perform the provisioning and tear down the provisioning links when the provisioning is complete. Unfortunately, the provisioning systems in the wireless communication networks do not efficiently and effectively provision their virtual network elements.

Technical Overview

A provisioning system receives network element information from a wireless communication network that characterizes a virtual network element. The provisioning system determines that the virtual network element is active and that a provisioning data link is not operational between the virtual network element and the provisioning system. The provisioning system determines a network address for the virtual network element. The provisioning system exchanges network signaling with the virtual network element using the network address to establish the provisioning data link. The provisioning system transfers provisioning data to the virtual network element over the provisioning data link.

DETAILED DESCRIPTION

Figure 1:
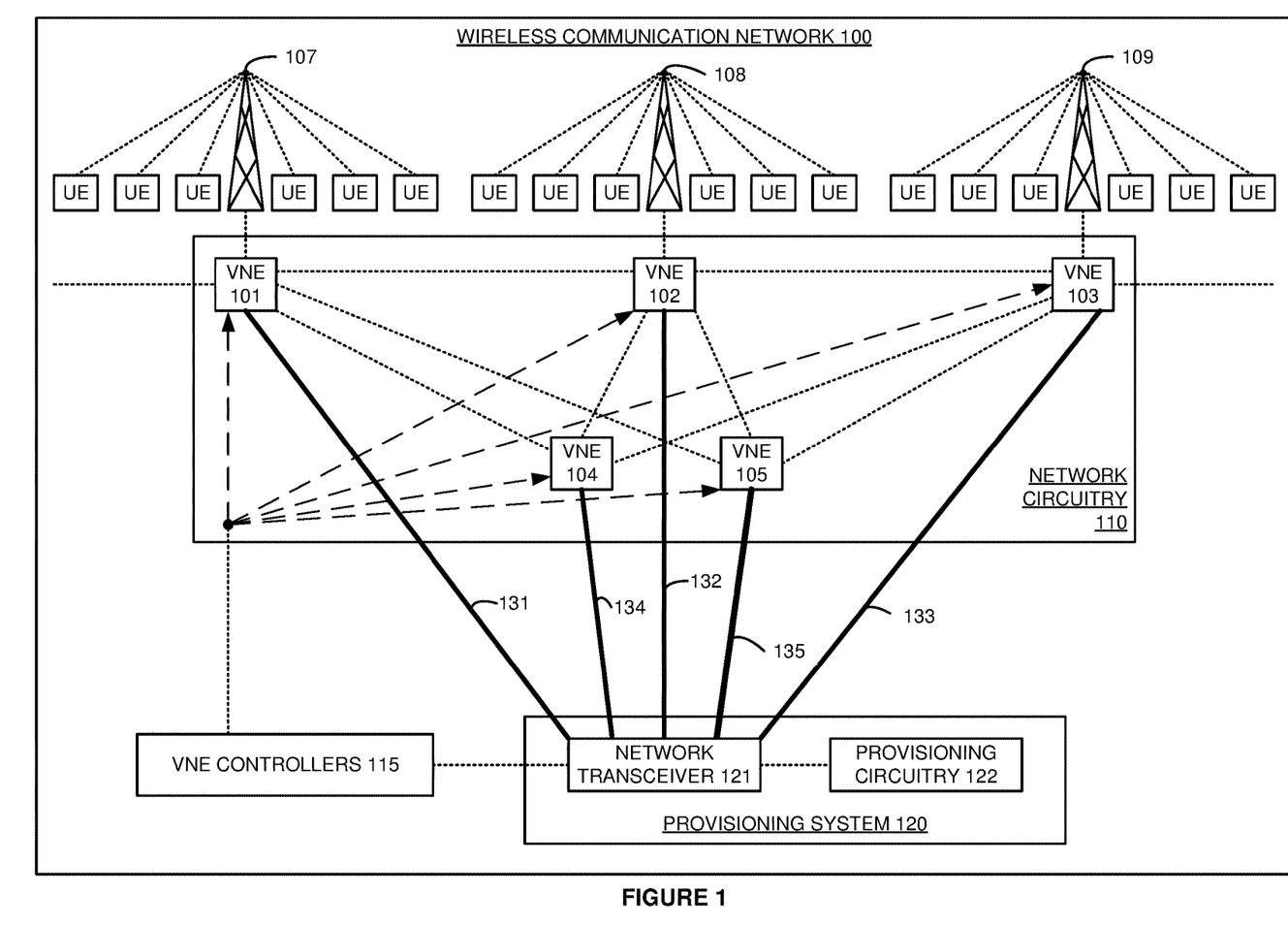
FIG. 1 illustrates a wireless communication network that provisions virtual network elements.

FIG. 1 illustrates wireless communication network 100 that provisions virtual network elements 101-105. Wireless communication network 100 comprises wireless access points 107-109, network circuitry 110, VNE controllers 115, and provisioning system 120. Network circuitry 110 stores and executes Virtual Network Elements (VNEs) 101-105. Provisioning system 120 comprises network transceiver 121 and provisioning circuitry 122 which are coupled together.

Wireless communication network 100 serves User Equipment (UEs) with data services like internet, machine communications, and/or conferencing. The UEs might be phones, computers, robots, machines, vehicles, sensors, and/or the like. The UEs and wireless access points 107-109 are wirelessly linked. Wireless access points 107-109 and VNEs 101-103 are linked. VNEs 101-103 and VNEs 104-105 are linked, and VNEs 104-105 are linked to various external systems like the internet or social networks (not shown). Network circuitry 110 and VNE controllers 115 are linked. VNE controllers 115 and network transceiver 121 in provisioning system 120 are linked. Network transceiver 121 in provisioning system 120 and VNEs 101-105 are linked over provisioning links 131-135.

Network circuitry 110 comprises data transceivers, microprocessors, memories, bus interfaces, and software. The software comprises hardware drivers, operating systems, virtual components, and VNEs 101-105. The microprocessors retrieve and execute the software that is stored in the memories to serve the UEs with the data services. In some examples, network circuitry 110 comprises one or more Network Function Virtualization Infrastructures (NFVIs) and VNEs 101-105 comprise Virtual Network Functions (VNFs).

VNEs 101-105 may be active/instantiated or inactive/deinstantiated. Active/instantiated VNEs 101-105 have ongoing microprocessors, memories, and virtual components that are allocated for their operation by network circuitry 110. Inactive/de-instantiated VNEs 101-105 do not have microprocessors, memories, or virtual components allocated for their operation. Exemplary VNEs 101-105 comprise Fifth Generation Core (5GC) Access and Mobility Management Function (AMF), 5GC Session Management Function (SMF), 5GC User Plane Function (UPF), Software Defined Network (SDN) applications, SDN controllers, SDN data machines, Long Term Evolution (LTE) Mobility Management Entity (MME), LTE Serving Gateway (SGW), and/or the like. In some examples, VNEs 101-105 comprise Radio Access Network (RAN) components like Fifth Generation New Radio (5GNR) Radio Resource Control (RRC), 5GNR Service Data Application Protocol (SDAP), 5GNR Packet Data Control Protocol (PDCP), LTE RRC, LTE PDCP, and/or the like.

VNE controllers 115 comprise data transceivers, microprocessors, memories, bus interfaces, and software. The software comprises hardware drivers, operating systems, and VNE controllers. The microprocessors retrieve and execute the software that is stored in the memories to start and stop the execution of VNEs 101-105 in network circuitry 110. In some examples, VNE controllers 115 comprise Network Function Virtualization (NFV) Management and Orchestration (MANO) computers.

In provisioning system 120, network transceiver 121 comprises transmitters, receivers, Digital Signal Processors (DSPs), memory, bus interfaces, and software. Network transceiver 121 may comprise a Network Interface Card (NIC), Network-On-Chip (NOC), data port circuitry, and/or the like. Provisioning circuitry 122 comprises microprocessors, memory, bus interfaces, and software. Provisioning system 120 may comprise an independent system or be integrated within circuitry like network circuitry 110 or VNE controllers 115.

In operation, the UEs wirelessly exchange data and signaling with wireless access points 107-109. Wireless access points 107-109 exchange corresponding data and signaling with VNEs 101-103. VNEs 101-103 exchange corresponding data and signaling with VNEs 104-105. VNEs 104-105 exchange corresponding data and signaling with external systems like messaging servers and enterprise computers. During these operations, VNE controllers 115 direct network circuitry 110 to start and stop VNEs 101-105. At any given time, VNEs 101-105 may be running or idle. In the typical situation, VNE controllers 115 might contemporaneously instantiate and de-instantiate thousands VNEs.

VNE controllers 115 publish network element information that characterizes the VNEs that it instantiates and de-instantiates including VNEs 101-105. The network element information indicates instantiation status and contact information. Network transceiver 121 receives a version of the network element information—possibly through intermediate systems. Network transceiver 121 transfers the network element information to provisioning circuitry 122. Provisioning circuitry 122 processes the network element information to detect any active VNEs that do not have provisioning links and to detect any inactive VNEs that have provisioning links. Provisioning circuitry 122 maintains data structures that associate the VNEs, VNE addresses, VNE links, VNE types, VNE regions, VNE versions, and the like. Provisioning circuitry 122 compares incoming the network element information to its data structures in real-time or with high-frequency to detect the VNEs and links in a timely manner.

Provisioning circuitry 122 terminates any active provisioning links for any inactive VNEs 101-105 and updates its data structures. Terminating a provisioning links entails clearing link context from memory and releasing microprocessor resources. For an active VNE that does not have a provisioning link, provisioning circuitry 122 determines a network address for the VNE. For example, provisioning circuitry 110 may use a domain name service to translate a VNF ID from the network element information into a network address. Provisioning circuitry 122 exchanges network signaling and the network address with network transceiver 121 to initiate the provisioning link. Network transceiver 122 exchanges the network signaling with the VNF using the network address to establish the provisioning link.

Consider a situation where VNE 103 was just instantiated by network circuitry 110 under the direction of VNE controller 115. VNE 103 does yet not have provisioning link 133. Provisioning circuitry 122 detects instantiated VNE 103 that is without provisioning link 133. Provisioning circuitry 122 translates the ID for VNE 103 into an Internet Protocol (IP) address and port. Network transceiver 121 uses the IP address/port to exchange network signaling with VNE 103 and establish provisioning link 133. Establishing provisioning link 133 entails, authentication, authorization, encryption, tunneling, and/or the like.

Provisioning circuitry 122 identifies provisioning data for the instantiated VNE. The provisioning data comprises operating software and data. The operating software and data supports network element tasks like packet routing, user authorization, session control, service accounting, and/or the like. Provisioning circuitry 122 typically processes the current VNE version and location (as indicated by the VNE itself or the network element information) to select the provisioning data. Provisioning circuitry 122 transfers the provisioning data to network transceiver 121 for delivery to the instantiated VNE over the new provisioning link. Network transceiver 121 transfers the network provisioning data to the instantiated VNE over the new provisioning link. For example, provisioning circuitry 122 may enter a data structure with the VNE type and VNE version for VNE 103 to yield a specific packet inspection software update. The near real-time establishment of the provisioning links 131-135 allows provisioning circuitry 122 to synchronize VNE software versions for VNEs 101-105 across VNE types and geographic regions.

For example, provisioning circuitry 122 might synchronize router software in packet gateways in the east coast region. As soon as a new packet gateway is instantiated in the east coast region, provisioning circuitry 122 detects and synchs the new gateway VNE to the desired router software version. As soon as new router software versions are released for the packet gateways in the east coast region, provisioning circuitry 122 has provisioning links ready to immediately install synchronized software updates in the gateway VNEs.

Advantageously, provisioning system 120 efficiently and effectively provisions VNEs 101-105 in wireless communication network 100.

Figure 2:
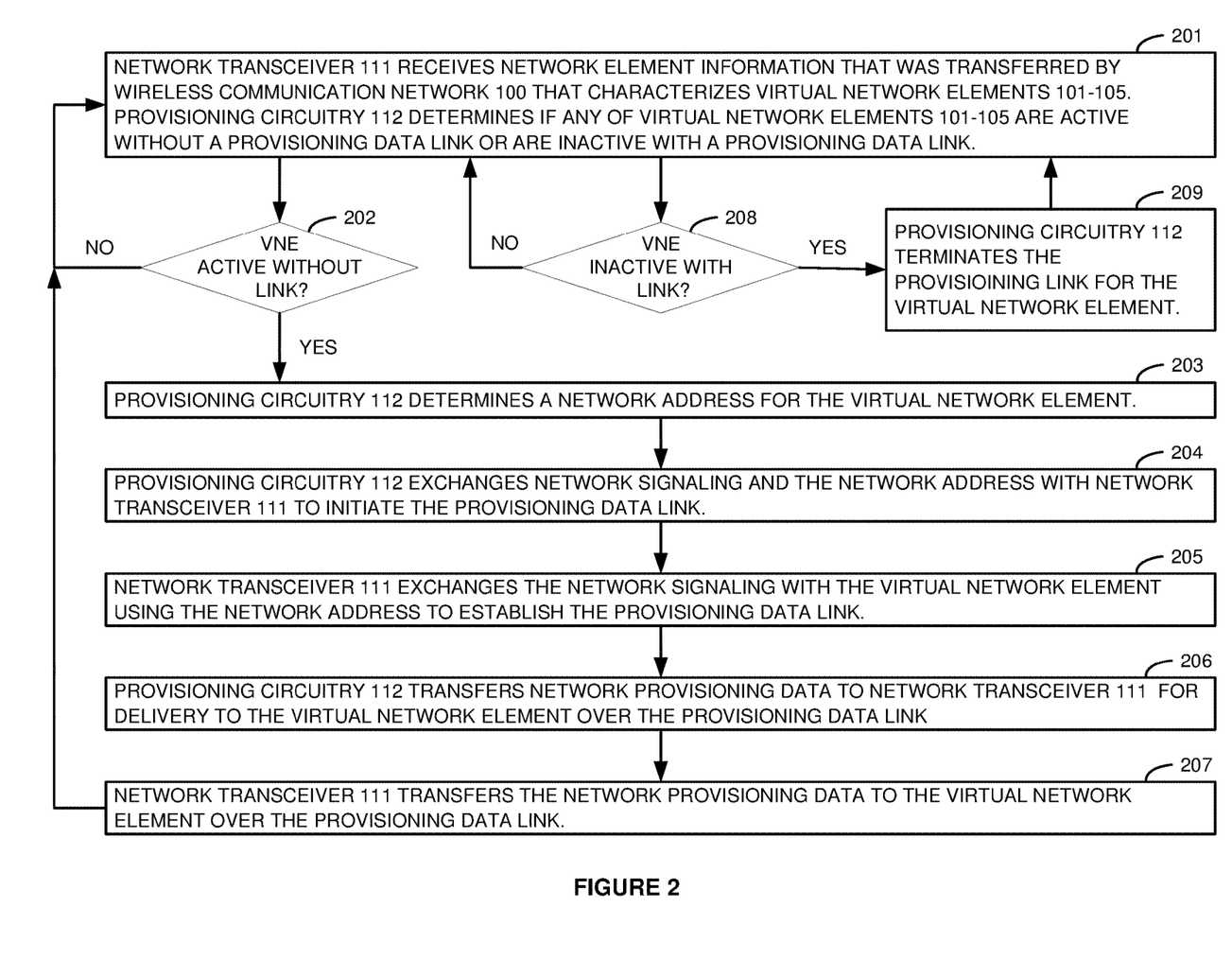
FIG. 2 illustrates the operation of a provisioning system to provision the virtual network elements in the wireless communication network.

FIG. 2 illustrates the operation of provisioning system 120 to provision VNEs 101-105 in wireless communication network 100. Network transceiver 121 receives network element information from wireless communication network 100 that characterizes VNEs 101-105 (201). Provisioning circuitry 122 processes the network element information to detect any active VNEs 101-105 that do not have their corresponding provisioning links 131-135 (201). Provisioning circuitry 122 processes the network element information to detect any inactive VNEs 101-105 that still have their corresponding provisioning links 131-135 (201). When an active VNE is detected that does not have a provisioning link (203), provisioning circuitry 122 determines a network address for the VNE (203). Provisioning circuitry 122 exchanges network signaling and the network address with network transceiver 121 to initiate a provisioning link for the new VNE (204). Network transceiver 122 exchanges the network signaling with the VNF using the network address to establish the provisioning link (205). Provisioning circuitry 122 transfers provisioning data to network transceiver 121 for delivery to the VNE over the provisioning link (206). Network transceiver 121 transfers the network provisioning data to the virtual network element over the provisioning link (207). When an inactive VNE is detected that has a provisioning link (208), then provisioning circuitry 122 terminates the provisioning link for the inactive VNE (209).

Figure 3:
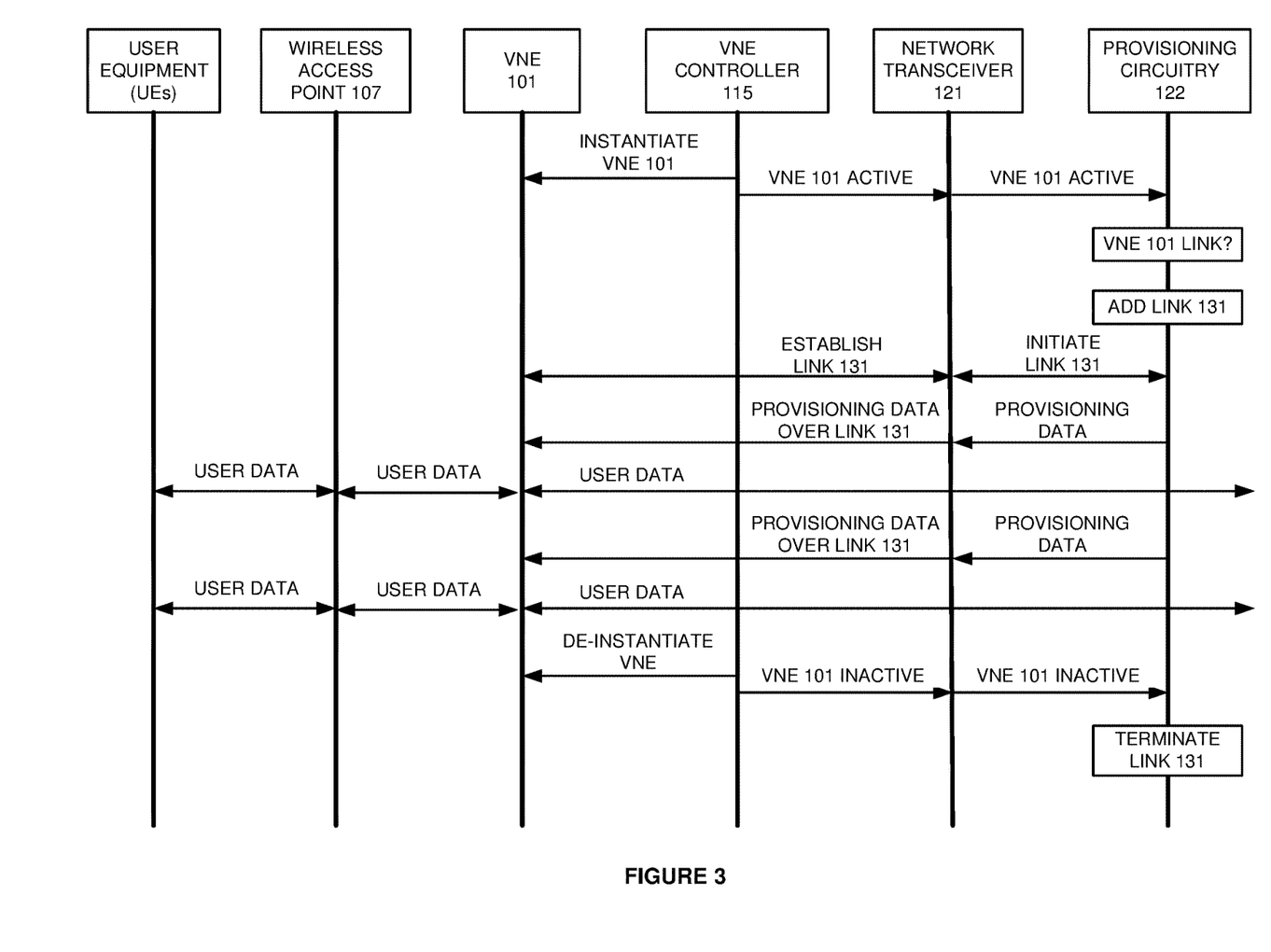
FIG. 3 illustrates the operation of the wireless communication network to provision the virtual network elements.

FIG. 3 illustrates the operation of wireless communication network 100 to provision VNE 101. VNE controller 115 instantiates VNE 101. VNE controller 115 then transfers network element information to network transceiver 121 that characterizes VNE 101 including its VNE identifier and instantiation status. The network element information may also indicate VNE address, VNE DNS, VNE type, VNE version, VNE location, and the like. Network transceiver 121 transfers the network element information to provisioning circuitry 122. Provisioning circuitry 122 processes the network element information to detect active VNE 101 and to determine if provisioning link 131 has been established for VNE 101.

In this case, VNE 101 is active but does not yet have provisioning link 131, so provisioning circuitry 122 determines a network address for VNE 101. Provisioning circuitry 122 may translate the VNE ID from the network element information into the VNE network address. Provisioning circuitry 122 exchanges network signaling and the network address with network transceiver 121 to initiate provisioning link 131. Network transceiver 121 exchanges the network signaling with VNF 101 using the network address to establish provisioning link 131.

Provisioning circuitry 122 selects and transfers provisioning data to network transceiver 121 for delivery to the VNE 101 over provisioning link 131. Network transceiver 121 transfers the provisioning data to VNE 101 over provisioning link 131. For example, provisioning circuitry 122 may synchronize VNE software for VNE 101 with the VNE software version for VNE 102. Some of the UEs then exchange wireless user with wireless access point 107 for a data service like internet access or social networking. Wireless access point 107 exchanges the user data for the data service with VNE 101. VNE exchanges the user data for the data service with other VNEs or systems (not shown).

In response to the instantiation of VNE 103, provisioning circuitry 122 transfers more provisioning data to network transceiver 121 for delivery to the VNE 101. Network transceiver 121 transfers the provisioning data to VNE 101 over provisioning link 131. For example, provisioning circuitry 122 may synchronize the VNE software for VNEs 101-102 with the newer VNE software version for new VNE 103. The UEs exchange wireless user data with wireless access point 107 for the data service. Wireless access point 107 exchanges the user data with VNE 101, and VNE 101 exchanges the user data for the data service the other systems.

VNE controller 115 de-instantiates VNE 101. VNE controller 115 then transfers network element information to network transceiver 121 that characterizes VNE 101 including its VNE identifier and de-instantiation status. Provisioning circuitry 122 processes the network element information to detect that VNE 101 is inactive and to determine that provisioning link 131 should be terminated. Provisioning circuitry 122 terminates provisioning link 131—typically by deleting communication context data from memory and by releasing the processing resources that were serving provisioning link 131.

Figure 4:
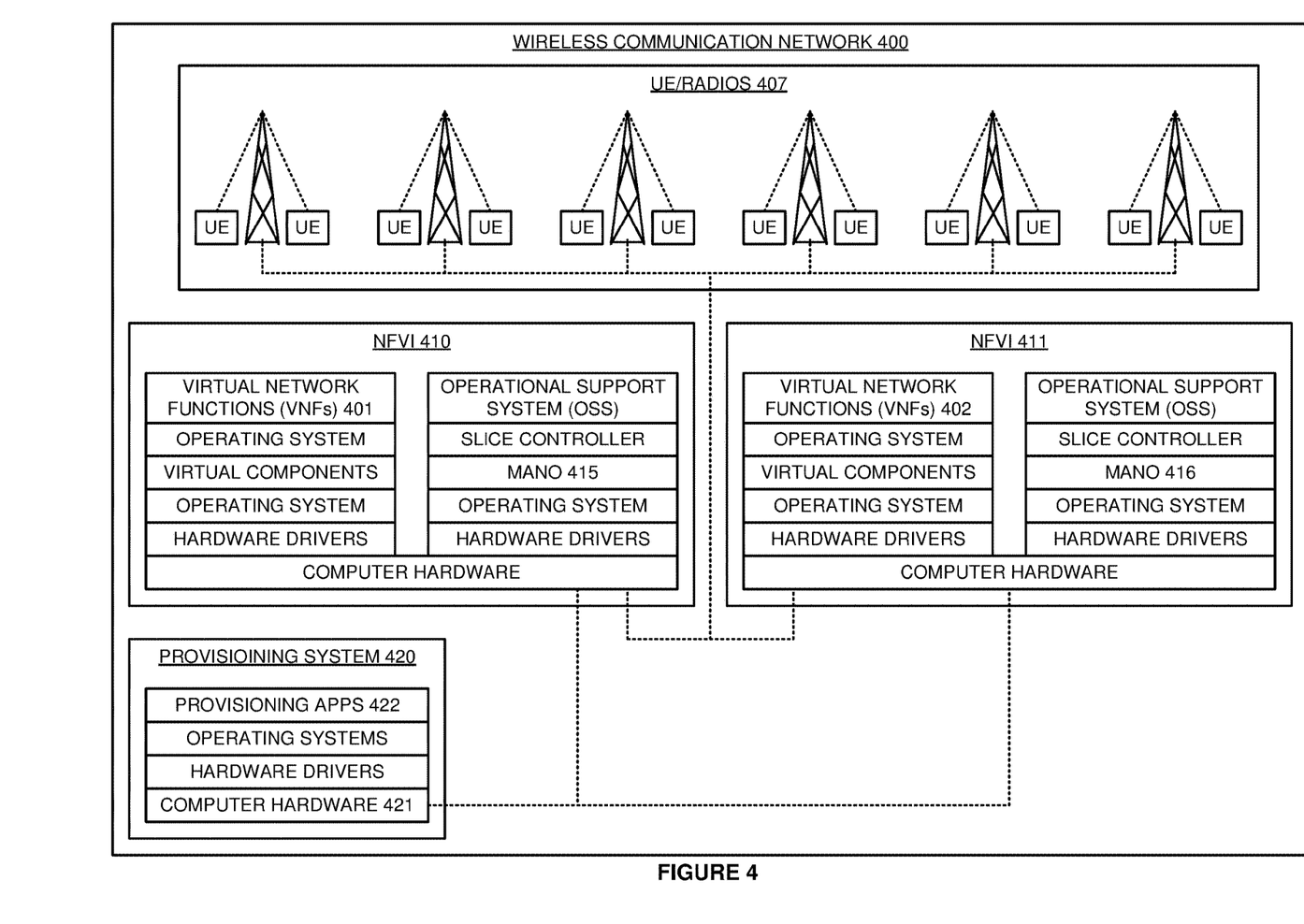
FIG. 4 illustrates a wireless communication network that provisions Network Function Virtualization (NFV) Virtual Network Functions (VNFs).

FIG. 4 illustrates wireless communication network 400 that provisions Network Function Virtualization (NFV) Virtual Network Functions (VNFs) 401-402. Wireless communication network 400 comprises UE/Radios 407, NFV Infrastructures (NFVIs) 410-411, and provisioning system 420. UE/Radios 407 comprises UEs and wireless access points that are wirelessly linked. The wireless access points are linked to NFVIs 410-411.

NFVIs 410-411 comprise computer hardware like microprocessors, memories, bus interfaces, and network transceivers. The microprocessors, memories, bus interfaces, and network transceivers store and execute hardware drivers. The memories store operating systems, virtual components, VNFs 401-402, and MANO 415-416. The virtual components comprise hypervisor modules, virtual switches, virtual machines, and the like. The microprocessors execute the operating systems, virtual components, VNFs 401-402, and MANO 415-416.

Provisioning system 420 comprises computer hardware 421 that comprises network transceivers, microprocessors, memories, and bus interfaces. The network transceivers, microprocessors, memories, and bus interfaces store and execute hardware drivers. The memories store operating systems and provisioning applications 422. The microprocessors execute the operating systems and provisioning applications 422 to provision VNFs 401-402.

VNFs 401-402 may be active/instantiated or inactive/de-instantiated. Active/instantiated VNFs 401-402 have ongoing computer hardware and software that are allocated for their operation. Inactive/de-instantiated VNFs 401-402 do not have computer hardware and software allocated for their operation. Exemplary VNF 401-405 comprise 5GC AMF, 5GC SMF, 5GC UPF, 5GNR RRC, 5GNR SDAP, 5GNR PDCP, SDN application, SDN controller, SDN data machine, LTE MME, LTE SGW, LTE RRC, LTE PDCP, and/or the like.

In NFVIs 410-411, the Operational Support Systems (OSSs) direct their slice controllers to implement new network slices that include VNFs 401-402. The slice controllers direct MANO 415-416 to instantiate VNFs 401-402 to serve the new network slices. MANO 415-416 directs the operating systems in NFVIs 410-411 to instantiate VNFs 401-402. The UEs wirelessly exchange data and signaling with the wireless access points in UE/Radios 407. The wireless access points exchange corresponding data and signaling with VNFs 401-402. VNFs 401-402 exchange corresponding data and signaling with external systems like conferencing servers and machine controllers.

MANO 415-416 transfers VNF information that characterizes VNFs 401-402 to provisioning applications 422. Provisioning applications 422 maintain data structures that associates VNF addresses, VNF links, VNF types, VNF regions, VNF versions, and the like. Provisioning applications 422 compare incoming network element information to the data structures in real-time to detect any active VNFs 401-402 that do not have provisioning links. Provisioning applications 422 compare the incoming network element information to the data structures in real-time to detect any inactive VNFs 401-402 that have provisioning links.

For newly active VNFs 401-402 that do not yet have provisioning links, provisioning applications 422 determine network addresses for the VNFs by translating VNF names into IP addresses. Provisioning applications 422 exchange network signaling with active VNFs 401-402 using the IP addresses to establish the provisioning links. Establishing the provisioning links entails provisioning applications 422 and VNFs 401-402 performing authentication, authorization, encryption, and tunneling.

Provisioning applications 422 identify provisioning data for new VNFs 401-402. The provisioning data comprises software and/or data that directs the operation of VNFs like AMF, SMF, UPF, RRC, SDAP, PDCP, and/or the like. For example, provisioning applications 422 may enter a data structure with the VNF type, version, and region to yield the appropriate AMF software update. Provisioning applications 422 transfer the provisioning data to new VNFs 401-402.

In NFVIs 410-411, the OSS direct their slice controllers to terminate the network slices that include VNFs 401-402. The slice controllers direct MANO 415-416 to de-instantiate VNFs 401-402 that served the network slices. MANO 415-416 directs the operating systems in NFVIs 410-411 to de-instantiate VNFs 401-402. VNFs 401-402 no longer exchange data and signaling for the data services. MANO 415-416 transfers VNF information that characterizes VNFs 401-402 to provisioning applications 422. Provisioning applications 422 compare the incoming VNF information to detect any inactive VNFs 401-402 that have provisioning links. Provisioning applications 422 terminate any active provisioning links for inactive VNFs 401-402 and updates the data structures.

Figure 5:
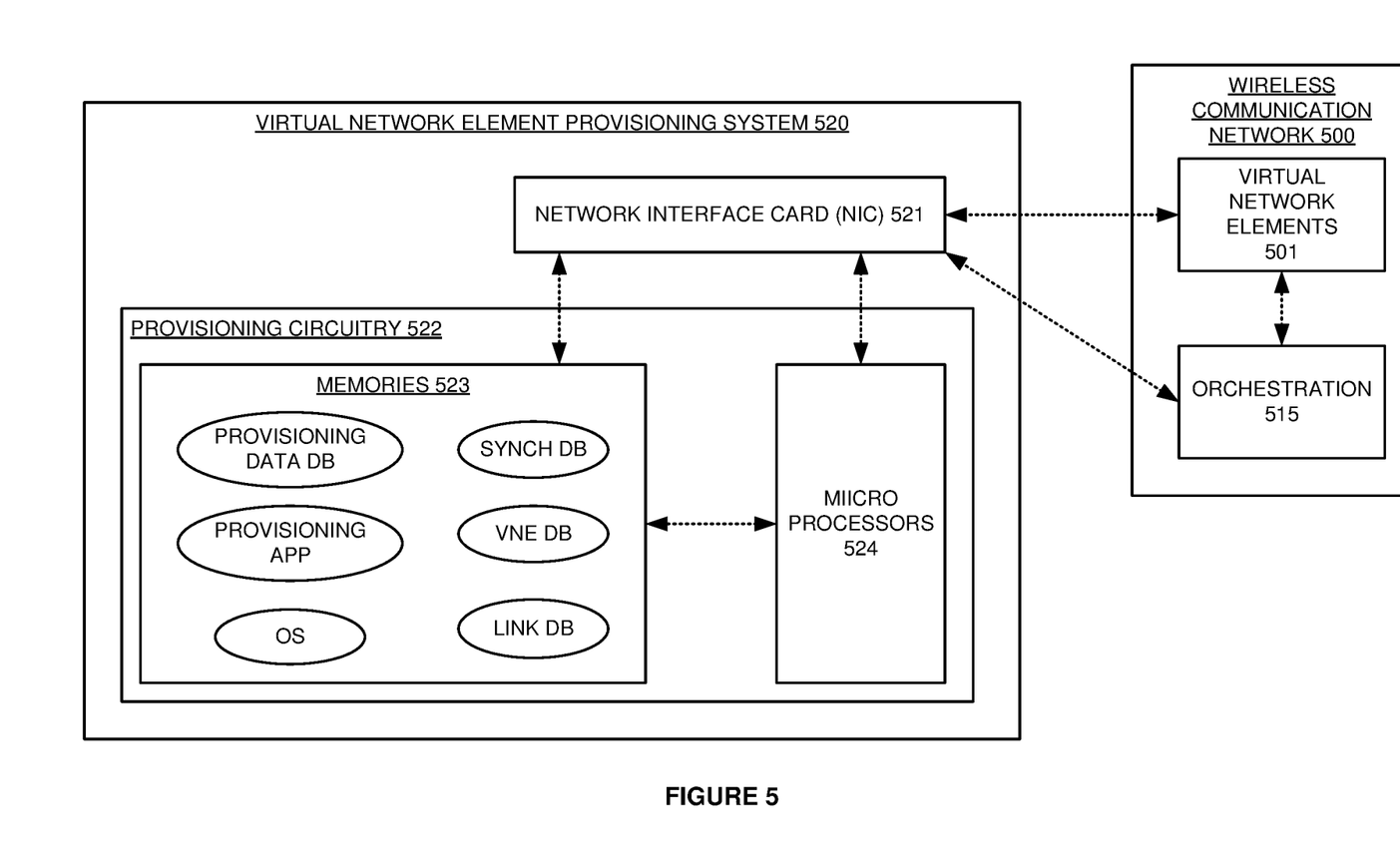
FIG. 5 illustrates virtual network element provisioning system to provision virtual network elements in a wireless communication network.

FIG. 5 illustrates virtual network element provisioning system 520 to provision virtual network elements 501 in wireless communication network 500. Wireless communication network 500 comprises virtual network elements 501 and orchestration 515. Virtual network element provisioning system 520 comprises Network Interface Card (NIC) 521, and provisioning circuitry 522. Provisioning circuitry 522 comprises memories 523 and microprocessors 524. Memories 523 store an operating system (OS), provisioning application, provisioning data database (DB), synchronization database, VNE database, and link database. Microprocessors 524 execute the operating system and provisioning application to maintain the databases and transfer the provisioning data to virtual network elements 501 as described herein.

Figure 6:
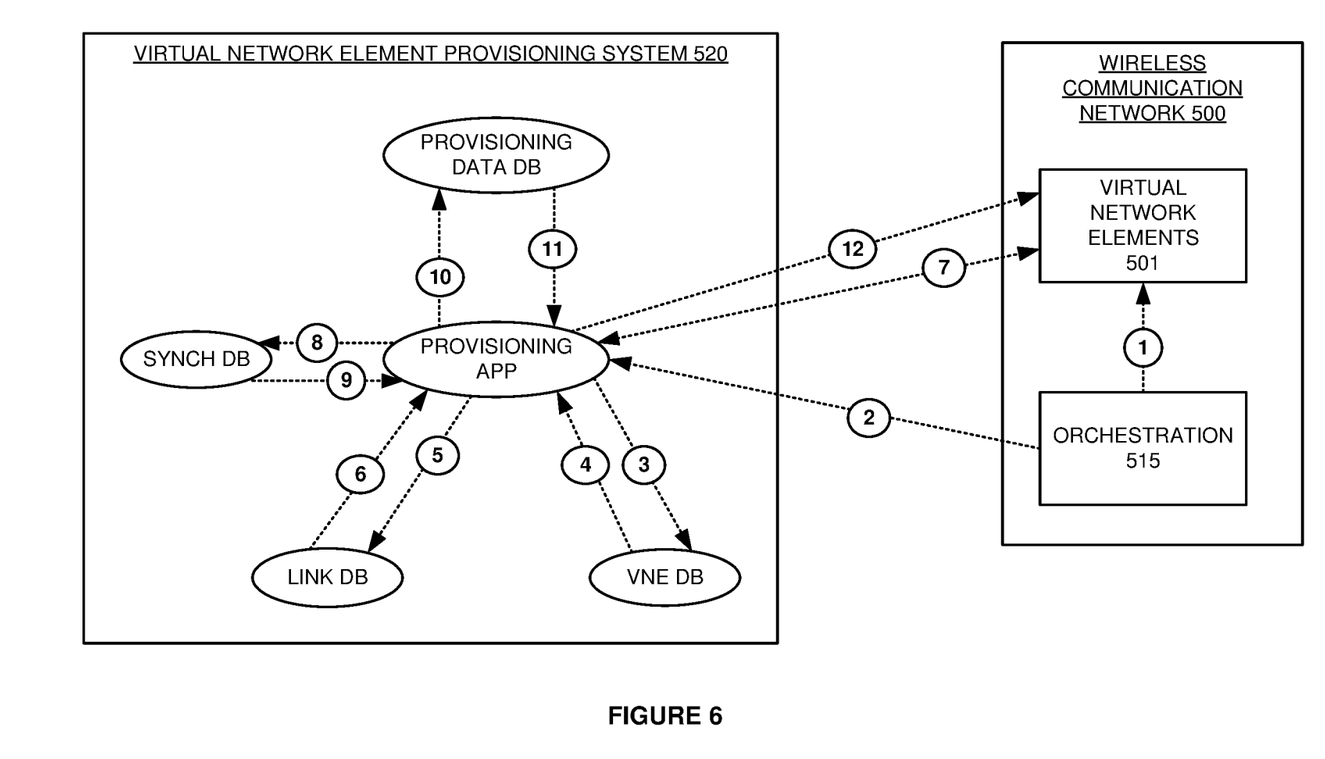
FIG. 6 illustrates the operation of the virtual network element provisioning system to provision the virtual network elements in the wireless communication network.

FIG. 6 illustrates the operation of virtual network element provisioning system 520 to provision virtual network elements 501 in wireless communication network 500. In a first operation, orchestration 515 instantiates a new VNE in virtual network elements 501. In a second operation, orchestration 515 notifies the provisioning application of the new VNE. In a third operation, the provisioning application transfers the new VNE ID to the VNE DB to yield a "no VNE" result. In a fourth operation, the VNE DB returns the negative VNE result to the provisioning application. In a fifth operation, the provisioning application transfers the new VNE ID to the link DB to yield a "no link" result. In a sixth operation, the link DB returns the negative link result for the new VNE to the provisioning application. In a seventh operation, the provisioning application establishes a provisioning link with the new VNE in virtual network elements 501.

In an eighth operation, the provisioning application transfers new VNE metadata to the synch DB to yield a provisioning data version for the new VNE. In a ninth operation, the synch DB returns a synchronized provisioning data version for the new VNE to the provisioning application. In a tenth operation, the provisioning application transfers the synchronized provisioning data version to the provisioning data DB to yield the provisioning data for the new VNE. In an eleventh operation, the provisioning data DB returns the synchronized provisioning data for the new VNE to the provisioning application. In a twelfth operation, the provisioning application transfers the synchronized provisioning data to the new VNE in virtual network elements 501.

The wireless data network circuitry described above comprises computer hardware and software that form special-purpose wireless network provisioning circuitry to efficiently and effectively provision virtual network elements. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless network provisioning circuitry to efficiently and effectively provision virtual network elements.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a provisioning system to provision a wireless communication network, the method comprising:
 a network transceiver receiving network element information that was transferred by the wireless communication network and that characterizes a virtual network element;

a provisioning circuitry determining that the virtual network element is active and that a provisioning data link is not operational between the virtual network element and a processing circuitry responsive to the reception of the network element information;

the provisioning circuitry determining a network address for the virtual network element responsive to the determination that the provisioning data link is not operational;

the provisioning circuitry exchanging network signaling and the network address with the network transceiver to initiate the provisioning data link;

the network transceiver exchanging the network signaling with the virtual network element using the network address to establish the provisioning data link;

the provisioning circuitry transferring network provisioning data to the network transceiver for delivery to the virtual network element over the provisioning data link;

the network transceiver transferring the network provisioning data to the virtual network element over the provisioning data link; and the provisioning circuitry terminating the provisioning data link between the virtual network element and the provisioning circuitry responsive to the determination that the virtual network element is inactive.

2. The method of claim 1 further comprising:

the network transceiver receiving additional network element information that was transferred by the wireless communication network and that characterizes the virtual network element;

the provisioning circuitry determining that the virtual network element is inactive responsive to the reception of the additional network element information.

3. The method of claim 1 wherein the provisioning circuitry determining that the provisioning data link is not operational between the virtual network element and the processing circuitry comprises maintaining a data structure that indicates when the provisioning data link is operational.

4. The method of claim 1 wherein the provisioning circuitry transferring the network provisioning data comprises synchronizing the virtual network element with other virtual network elements.

5. The method of claim 1 wherein the provisioning circuitry transferring the network provisioning data comprises synchronizing the virtual network element with other virtual network elements of a same type.

6. The method of claim 1 wherein the provisioning circuitry determining the network address for the virtual network element comprises transferring a virtual network identifier for the virtual network element to the network transceiver for transfer to the wireless communication network and receiving an Internet Protocol (IP) address for the virtual network element from the network transceiver that was transferred by the wireless communication network.

7. The method of claim 1 wherein the network address comprises an Internet Protocol (IP) address.

8. The method of claim 1 wherein the wireless communication network comprises one or more Network Function Virtualization (NFV) Management and Orchestrations (MANOs).

9. The method of claim 1 wherein the virtual network element comprises a Network Function Virtualization (NFV) Virtual Network Function (VNF).

10. The method of claim 1 wherein the wireless communication network comprises one or more Network Function Virtualization (NFV) Management and Orchestration (MANO) systems.

11. A provisioning system to provision a wireless communication network, the provisioning system comprising:

a network transceiver configured to receive network element information that was transferred by the wireless communication network and that characterizes a virtual network element;

a provisioning circuitry configured to determine that the virtual network element is active and that a provisioning data link is not operational between the virtual network element and a processing circuitry responsive to the reception of the network element information;

the provisioning circuitry configured to determine a network address for the virtual network element responsive to the determination that the provisioning data link is not operational;

the provisioning circuitry configured to exchange network signaling and the network address with the network transceiver to initiate the provisioning data link;

the network transceiver configured to exchange the network signaling with the virtual network element using the network address to establish the provisioning data link;

the provisioning circuitry configured to transfer network provisioning data to the network transceiver for delivery to the virtual network element over the provisioning data link;

the network transceiver configured to transfer the network provisioning data to the virtual network element over the provisioning data link; and the provisioning circuitry configured to terminate the provisioning data link between the virtual network element and the provisioning circuitry responsive to the determination that the virtual network element is inactive.

12. The provisioning system of claim 11 further comprising:

the network transceiver configured to receive additional network element information that was transferred by the wireless communication network and that characterizes the virtual network element;

the provisioning circuitry configured to determine that the virtual network element is inactive responsive to the reception of the additional network element information.

13. The provisioning system of claim 11 wherein the provisioning circuitry is configured to maintain a data structure that indicates when the provisioning data link is operational.

14. The provisioning system of claim 11 wherein the provisioning circuitry is configured to synchronize the virtual network element with other virtual network elements.

15. The provisioning system of claim 11 wherein the provisioning circuitry is configured to synchronize the virtual network element with other virtual network elements of a same type.

16. The provisioning system of claim 11 wherein the provisioning circuitry is configured to transfer a virtual network identifier for the virtual network element to the network transceiver for transfer to the wireless communication network and to receive an Internet Protocol (IP) address for the virtual network element from the network transceiver that was transferred by the wireless communication network.

17. The provisioning system of claim 11 wherein the network address comprises an Internet Protocol (IP) address.

18. The provisioning system of claim 11 wherein the wireless communication network comprises one or more Network Function Virtualization Infrastructures (NFVIs).

19. The provisioning system of claim 11 wherein the virtual network element comprises a Network Function Virtualization (NFV) Virtual Network Function (VNF).

20. The provisioning system of claim 11 wherein the wireless communication network comprises one or more Network Function Virtualization (NFV) Management and Orchestration (MANO) systems.

* * * * *